Patented Aug. 25, 1931

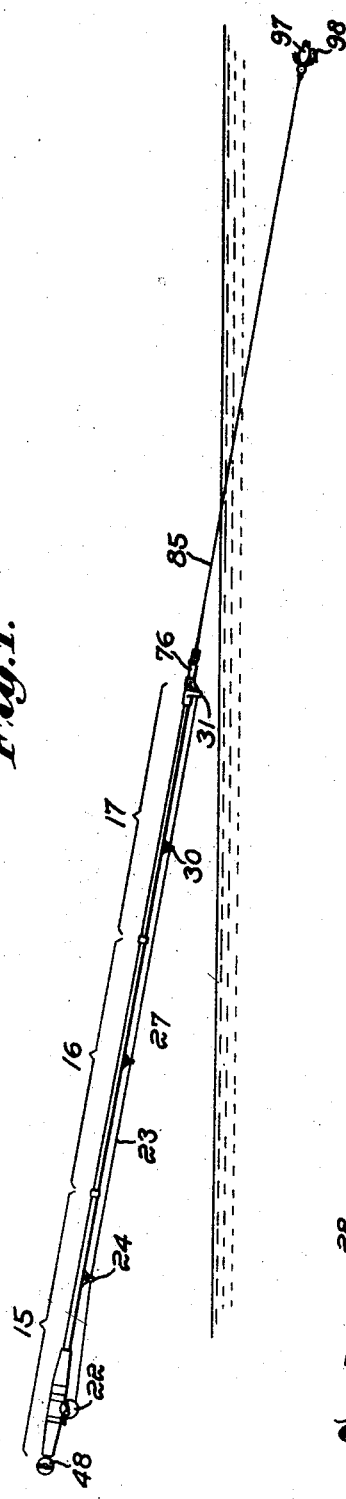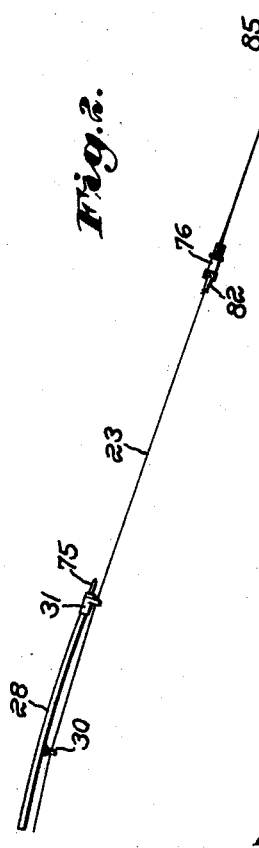

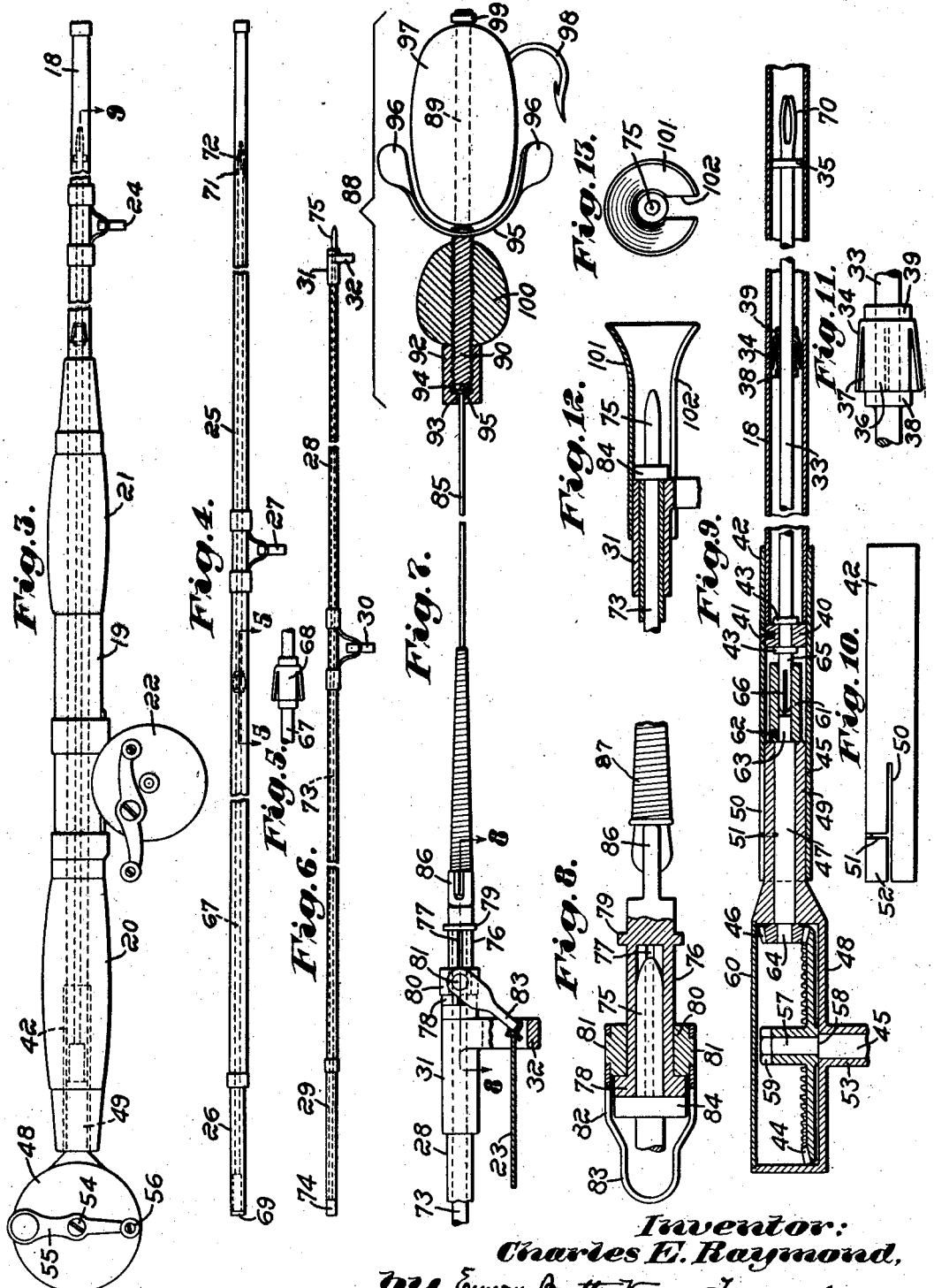

1,820,326

UNITED STATES PATENT OFFICE

CHARLES E. RAYMOND, OF BOSTON, MASSACHUSETTS

FISHING APPARATUS

Application filed July 25, 1930. Serial No. 470,613.

This invention relates to novel and improved fishing apparatus for catching fish by the use of spinning artificial bait. The invention will best be understood by reference to the following description, when taken in connection with the accompanying drawings of one specific embodiment thereof, while its scope will be pointed out more particularly in the appended claims.

In the drawings:

Fig. 1 is an elevation of a fishing apparatus embodying the invention, illustrating the same somewhat as it appears at the beginning of the operation, before the fish seizes the bait;

Fig. 2 is an elevation illustrating the bait, the leader, the line, and the tip of the pole, after the fish has seized the bait, and the coupling which previously coupled the leader to the shaft has become detached from the latter, and the leader is attached to the pole solely by the line;

Fig. 3 is an elevation of the first section of the rod with the reel for the line, and with the shaft-rotating mechanism;

Fig. 4 is an elevation of the second section, which is intended to be fitted to the first section;

Fig. 5 is a sectional view on an enlarged scale, on line 5—5 of Fig. 4;

Fig. 6 is an elevation of the third section, which is intended to be fitted to the second section;

Fig. 7 is an elevation of the forward end or tip of the third section, together with the leader having at its rearward end a coupling attached to the shaft, and at its forward end the artificial bait with its hook, and the rotating spinner which attracts the fish and also serves to exert an outward pull on the leader to keep the latter extended;

Fig. 8 is a sectional view at a still further enlarged scale, on line 8—8 of Fig. 7;

Fig. 9 is a sectional view, on an enlarged scale, on line 9—9 of Fig. 3, but with the handle omitted;

Fig. 10 is a plan of a sleeve by which the shaft-rotating mechanism is attached to the first section of the rod;

Fig. 11 is a plan of a portion of the shaft of the first section with one of its bearings;

Fig. 12 is a longitudinal, sectional view on a large scale, illustrating a bell-mouthed guide applied to the tip of the pole for guiding the leader coupling back into engagement with the tip of the shaft by simply winding in the line; and Fig. 13 is an end elevation, as viewed from the right-hand side of Fig. 12.

Referring to the drawings, and to the embodiment of the invention which is illustrated therein, and having reference at first particularly to Fig. 1, there is shown a fishing apparatus comprising a rod having a first section 15, a second section 16 and a third section 17. The first section, shown in detail in Fig. 3 and also in Fig. 9, comprises a tube 18, on and about which there is a usual sleeve 19, presenting handles 20 and 21. To this sleeve there is attached a reel 22 of known construction, upon which to wind a line 23, guided by an eye 24 of common form, which is attached to the tube 18. The second section, shown in Fig. 4, comprises a tube 25 of smaller diameter, having a ferrule 26, of reduced diameter to be fitted into the forward end of the first section in the usual manner. The second section is provided with a usual eye 27 to receive the line. The third section, shown in Fig. 6, comprises a tube 28, of still smaller diameter, provided with a ferrule 29, which is intended to be fitted into the forward end of the tube 25. This section is provided with an eye 30 to receive the line, and at its forward end is provided with a tip 31, having an eye 32, through which the line is to extend.

Referring now to Fig. 9, the first section of the rod comprises a shaft section 33, which in the present example is within the tube 18, and is supported by two collars 34 and 35, whose construction is such as to permit of a flexing action of the tube, and the enclosed shaft section, without binding. The collar 34 is in the nature of a sleeve presenting a flange 36, rendered flexible as by providing the same with one or more, herein a plurality, of longitudinal slots 37

(see Fig. 11). This flange springs radially when the shaft section bends. This sleeve is held against movement longitudinally of the shaft section 35, by providing the latter with collars 38 and 39,—one at each end of the sleeve, and suitably affixed, as by brazing to the shaft. The collar 35 is secured as by brazing to the shaft section and normally does not touch the internal surface of the tube 18.

The rear end of the shaft section turns in a bearing, herein a sleeve 40 which abuts against the rear end of the tube 18 and is secured as by a screw 41 to a sleeve 42, the latter being secured as by brazing to and about the tube 18. The shaft section 33 is held against axial displacement by collars 43 suitably secured as by brazing to the shaft section.

The sleeve 42 serves as a means to attach to the first section of the rod a driving mechanism which is employed to rotate the shaft. This driving mechanism comprises a bevel gear 44 secured to a transverse shaft 45, and meshing with a bevel pinion 46, which is secured as by brazing to a longitudinal shaft 47. The gears and the shafts to which they are secured are mounted in a housing 48, presenting a stem 49 which affords a bearing for the shaft 47, and is frictionally held in the sleeve 43, as by providing the latter with a longitudinal slot 50, and a transverse slot 51 communicating with the slot 50. Between the slot 51 and the rear end of the sleeve, the wall of the sleeve is bent inwardly very slightly, as at 52, to exert a yielding pressure upon the stem 49 of the housing 48, thereby to hold the stem in place in the sleeve.

The housing presents a boss 53, affording a bearing for the transverse shaft 45. To the outer end of the latter, there is secured, as by a screw 54 (see Fig. 3), a crank 55, having a handle 56 by means of which the shaft may be rotated. The bevel gear 44 is conveniently secured to the shaft by providing the latter with a reduced portion 57 and a shoulder 58, against which the gear is secured by a nut 59 threaded onto the inner end of the shaft. A removable cover-plate 60, snugly fitted into the housing, affords access to the interior of the latter, should occasion require.

The longitudinal shaft 47 is conveniently held against longitudinal displacement in one direction by a collar 61 secured as by a screw 62 to a reduced portion 63 of the shaft, and in the opposite direction by the bevel pinion 46, which is secured to a reduced portion 64 on the other end of the shaft. The shaft 47 is coupled to and drives the shaft section 33 by a frictional coupling, herein a cylindrical stem 65 presented by the rear end of the shaft section 33 and fitted into the bore of the collar 61, such stem being slotted, as at 66, and slightly expanded to cause it to engage the bore of the collar with sufficient pressure to enable the shaft section to be driven. The housing can be dismounted by simply pulling the same rearwardly, the collar 61 withdrawing from the stem 65 as the stem 49 is withdrawn from the sleeve 42.

The second shaft section will now be described, reference being had to Figs. 4 and 5. Within the tube 25, there is a second shaft section 67, the central portion of which is supported in a bearing 68 similar to the bearings 34 and 35 described in connection with the first section. The rear end of the shaft section 67 is provided with a hollow, enlarged ferrule 69, which has a bearing within the ferrule 26, and is frictionally coupled to the forward end of the shaft section 33 by providing the latter with a longitudinal, slotted, terminal portion 70, adapted to be pushed into the ferrule 69. The forward end of the shaft section 67 is prrovided with an enlarged portion 71, having a bearing in the tube 25, and forwardly of this point the shaft section is provided with a longitudinally slotted terminal 72, for attachment to the third shaft section now to be described.

Referring now to Fig. 6, a shaft section 73, within the tube 28 and loosely fitting the interior of the latter, is provided at its rear end with an enlarged hollow ferrule 74, which receives the slotted terminal 72 of the shaft section 67, and thus provides a frictional coupling between the two shaft sections.

Thus it is apparent that the three sections of the rod can be coupled together by simply pushing one into the other, thus not only coupling their tubes together, but also coupling their shaft sections together, by the mere axial movement of one section toward the other.

The forward end of the shaft section 73 protrudes beyond the tip 31, and is tapered as at 75, as best shown in Fig. 8, to slide into a coupling 76, having longitudinal slots 77 to enable the coupling to grip the terminal of the shaft section with yielding pressure. The friction thus produced is great enough to cause the coupling to be driven, and to hold the coupling in place until it is forcibly withdrawn by the fish in the manner presently to be described. Slidably mounted upon the coupling between shoulders 78 and 79 on the latter, there is a sleeve 80, which presents trunnions 81 on which there is pivoted a bail or shackle 82, the latter presenting a loop 83, to which the line 23 is secured. Thus it is evident that when the coupling 76 is pulled off the tapered end 75 of the shaft section 73, the coupling remains attached to the line. To prevent the shaft section 73 from receding into the tube 28 when the coupling 76 is pushed onto the tapered end 75 of the shaft section, the latter is provided with a collar 84, suitably secured to the shaft section, as by brazing. This collar bears against the outer end of the tube 28, and the tip 31.

The coupling serves to couple to the shaft a flexible leader 85 of suitable material, such as gut, commonly employed for this purpose, and usually having a length of 12 feet or more. This leader is suitably attached at its inner end to the coupling, as by providing the latter with an eye 86, through which the end of the leader is passed and brought back upon itself, and then bound with a seizing 87 of thread, wound about the loop in the latter, and coated with varnish. To the outer end of the leader, there is attached an artificial bait 88, herein comprising a shaft 89, having a threaded portion 90, to which there is screwed a thimble 92, serving as a means of attachment to the leader, as by passing the latter through an axial opening 93 in the thimble, and making a knot 94 on the end of the leader within a chamber 95' presented by the thimble. To this shaft there is secured, as by brazing or soldering, a spinner 95 of bright metal, which attracts the fish. As shown, this spinner is provided with blades 96, somewhat similar to those of a propeller, the form and arrangement of which with reference to the direction of rotation of the shaft is such that the spinner exerts an outward pull on the leader, and keeps the same reasonably taut so long as rotation of the shaft is continued. The formation of the blades, moreover, is such that there is a tendency for the bait to descend a foot or two below the surface of the water. Loosely mounted on the shaft 89, there is an appropriately shaped body 97, which may be of wood or other suitable material, colored to attract the fish, and having secured to it a barbed hook 98. This body is held against axial movement in one direction by the spinner 95, and in the other direction by a collar 99, suitably secured as by brazing or soldering to the rear end of the shaft. As shown, there is also provided a body 100, fixedly secured to the shaft between the spinner and the thimble, as by screwing said body onto the threaded portion of the shaft. This body likewise may be made of suitable material such as wood, appropriately painted to attract the fish.

The operation of the apparatus will now be described, reference being had at first to Fig. 1. The leader is at first attached by its coupling to the shaft within the rod. The fisherman, holding the handle of the rod in one hand, turns the crank 57 in the proper direction to rotate the shaft, together with the leader and the spinning bait. The bait descends a foot or two into the water, and the leader is maintained reasonably taut by the action of the blades of the spinner in the water. When the fish seizes the bait and starts away with it, the coupling attaching the leader to the shaft is jerked off the end of the latter, and the line is paid out to whatever extent seems desirable. From then on until the fish is landed, the rod is handled like any ordinary fishing rod. If, however, the fish should become detached from the hook, it will then be necessary to reattach the leader to the shaft. This can be accomplished by grasping the coupling and pushing it onto the tip end of the shaft, or, if desired, there may be provided a bell-mouthed guide 101 (see Figs. 12 and 13), suitably formed on or secured to the tip 31 of the third or outermost section to guide the coupling 76 into proper registration with the tapered end 75 of the shaft section, and into its place on the latter, by simply winding in the line. This guide, as shown, is provided at its lower side with a slot 102 to receive the line, and when the coupling is to be reattached to the pole by winding in the line, the pole should be inverted—that is to say, it should be rotated 180 degrees about its longitudinal axis to present the slot at its upper side. This guide is not necessary, however, and may be omitted if desired.

Having thus described one embodiment of the invention, but without limiting myself thereto, what I claim and desire by Letters Patent to secure is:

1. Fishing apparatus comprising, in combination, a rod, a shaft supported by and extending lengthwise of said rod, means for rotating said shaft about its longitudinal axis, a flexible leader, a coupling member for detachably coupling said leader to the outer end of said shaft, a line attached to said coupling member and extending rearwardly along said rod, and a reel for winding in said line when said coupling member is detached from said shaft.

2. Fishing apparatus comprising, in combination, a rod, a shaft supported by and extending lengthwise of said rod, means for rotating said shaft about its longitudinal axis, a flexible leader, a coupling member for detachably coupling said leader to the outer end of said shaft, means for utilizing rotation of said leader by said shaft to exert an outward or forward pull on said leader, a line attached to said coupling member and extending rearwardly along said rod, and a reel for winding in said line when said coupling member is detached from said shaft.

3. Fishing apparatus comprising, in combination, a rod, a shaft supported by and extending lengthwise of said rod, means for rotating said shaft about its longitudinal axis, a flexible leader, a coupling member for detachably coupling said leader to the outer end of said shaft, a screw attached to said leader for utilizing rotation of the latter by said shaft to exert an outward or forward pull on said leader, a line attached to said coupling member and extending rearwardly along said rod, and a reel for winding in said line when said coupling member is detached from said shaft.

4. Fishing apparatus comprising, in combination, a sectional rod, a sectional shaft supported by and extending lengthwise of said rod, means for rotating said shaft about its longitudinal axis, a flexible leader, a coupling member for detachably coupling said leader to the outer end of said shaft, a line attached to said coupling member and extending rearwardly along said rod, and a reel for winding in said line when said coupling member is detached from said shaft.

5. Fishing apparatus comprising, in combination, a rod comprising a plurality of sections jointed together endwise and separable by lengthwise movement, a shaft comprising a plurality of sections jointed together endwise and supported, respectively, by the sections of said rod, the sections of said shaft being separable by lengthwise movement simultaneously with the separation of the sections of said rod, a flexible leader, a coupling member coupled endwise to the outer end of the outermost shaft section and separable therefrom by lengthwise movement, a line attached to said coupling member and extending rearwardly along said rod, and a reel for winding in said line when said coupling member is detached from said outermost sections of said shaft.

6. Fishing apparatus comprising, in combination, a tubular rod, a shaft extending lengthwise within said tubular rod, means for rotating said shaft about its longitudinal axis, a flexible leader, a coupling member for detachably coupling said leader to the outer end of said shaft, a line attached to said coupling member and extending rearwardly along the outside of said rod, and a reel for winding in said line when said coupling member is detached from said shaft.

7. Fishing apparatus comprising, in combination, a tubular rod, a shaft extending lengthwise within said tubular rod, means for rotating said shaft about its longitudinal axis, a flexible leader, a coupling member for detachably coupling said leader to the outer end of said shaft, a line attached to said coupling member and extending rearwardly along the outside of said rod, a reel for winding in said line when said coupling member is detached from said shaft, and means for guiding said coupling member into re-engagement with said shaft when said line is wound onto said reel to a sufficient extent.

8. Fishing apparatus comprising, in combination, a tubular rod, a shaft extending lengthwise within said tubular rod, means for rotating said shaft about its longitudinal axis, a flexible leader, a coupling member for detachably coupling said leader to the outer end of said shaft, a line attached to said coupling member and extending rearwardly along the outside of said rod, a reel for winding in said line when said coupling member is detached from said shaft, and a bell-mouthed guide for guiding said coupling member into re-engagement with said shaft when said line is wound onto said reel to a sufficient extent.

9. Fishing apparatus comprising, in combination, a tubular rod, a shaft extending lengthwise within said tubular rod, means for rotating said shaft about its longitudinal axis, a flexible leader, a coupling member for detachably coupling said leader to the outer end of said shaft, a line attached to said coupling member and extending rearwardly along the outside of said rod, a reel for winding in said line when said coupling member is detached from said shaft, and a bell-mouthed guide for guiding said coupling member into re-engagement with said shaft when said line is wound onto said reel to a sufficient extent, said guide having a longitudinal slot to receive said line.

10. Fishing apparatus comprising, in combination, a tubular rod, a shaft extending longitudinally of and within said rod, driving mechanism for rotating said shaft, and a housing which houses said driving mechanism and is attachable to and detachable from said rod by movement lengthwise of said rod.

11. Fishing apparatus comprising, in combination, a tubular rod, a shaft extending longitudinally of and within said rod, driving mechanism including a second shaft axially aligned with and coupled to the first-mentioned shaft by axial movement, and a housing which houses said driving mechanism and is attachable to and detachable from said rod by movement lengthwise of the latter.

12. Fishing apparatus comprising, in combination, a tubular, flexible rod, a flexible shaft extending lengthwise of and within said rod, a shaft-bearing flexibly mounted within said rod, mechanism for rotating said shaft, and a spinning bait driven by said shaft.

13. Fishing apparatus comprising, in combination, a tubular, flexible rod comprising a plurality of sections, a flexible shaft extending lengthwise of and within said rod and comprising a plurality of sections corresponding with said rod sections, a plurality of shaft-bearings flexibly mounted within said rod, means to prevent axial displacement of said bearings along said shaft, mechanism for rotating said shaft, and a spinning bait driven by said shaft.

In testimony whereof, I have signed my name to this specification.

CHARLES E. RAYMOND.